United States Patent
Kuehmstedt (10) Patent No.: US 11,959,269 B2
(45) Date of Patent: Apr. 16, 2024

(54) PLATFORM FOR STACKING CONTAINERS AS HOUSINGS OF COMPONENTS OF AN ENERGY CONVERSION SYSTEM, AND ENERGY CONVERSION SYSTEM

(71) Applicant: SMA Solar Technology AG, Niestetal (DE)

(72) Inventor: Janus Kuehmstedt, Ahnatal (DE)

(73) Assignee: SMA Solar Technology AG, Niestetal (DE)

(*) Notice: Subject to any disclaimer, the term of this patent is extended or adjusted under 35 U.S.C. 154(b) by 0 days.

(21) Appl. No.: 17/584,941

(22) Filed: Jan. 26, 2022

(65) Prior Publication Data

US 2022/0145611 A1    May 12, 2022

Related U.S. Application Data

(63) Continuation of application No. PCT/EP2021/063086, filed on May 18, 2021.

(30) Foreign Application Priority Data

Jun. 9, 2020  (DE) ..................... 10 2020 115 328.7

(51) Int. Cl.
*E04B 1/348*    (2006.01)
*E04H 1/12*    (2006.01)

(52) U.S. Cl.
CPC ............. *E04B 1/3483* (2013.01); *E04H 1/12* (2013.01); *E04H 2001/1283* (2013.01)

(58) Field of Classification Search
CPC ......... E04B 1/3483; E04H 1/12; E04H 1/005; E04H 2001/1283
See application file for complete search history.

(56) References Cited

U.S. PATENT DOCUMENTS 3,184,012 A * 5/1965 Ishimoto ................... E04B 1/24
52/646
4,416,385 A * 11/1983 Clare ................... B65D 88/126
217/43 A (Continued)

FOREIGN PATENT DOCUMENTS

DE    20305795 U1    6/2003

*Primary Examiner* — Gisele D Ford
(74) *Attorney, Agent, or Firm* — Eschweiler & Potashnik, LLC (57) ABSTRACT

The disclosure relates to a platform for the space-saving formation of an energy conversion system. In this, containers are stacked one above the other as housings of components of the energy conversion system with the platform arranged between the containers, wherein the platform has a frame structure which has, on a first side, first alignment elements for placing the platform on a first container and, on a second side, opposite the first side, of the frame structure, second alignment elements for placing a second container on a placement area of the frame structure. The first and second alignment elements are arranged in such a way that they result in an arrangement, which is laterally centered and vertically spaced apart by a height (H) of the platform, of the second container above the first container, wherein the frame structure forms a standing area, which circumferentially surrounds the placement area and is walkable by persons, as access to the second container. An energy conversion system can be designed as a stack of at least two containers as housings of components of the energy conversion system, between each of which containers such a platform is arranged.

16 Claims, 5 Drawing Sheets

(56) References Cited

U.S. PATENT DOCUMENTS

| | | | | |
|---|---|---|---|---|
| 4,592,175 | A * | 6/1986 | Werner | E04H 1/04 |
| | | | | 52/79.9 |
| 4,620,404 | A * | 11/1986 | Rizk | E04B 1/3483 |
| | | | | 52/510 |
| 5,528,866 | A * | 6/1996 | Yulkowski | E04B 1/3483 |
| | | | | 52/79.12 |
| 6,128,878 | A * | 10/2000 | Erickson | B28B 7/0029 |
| | | | | 52/319 |
| 8,484,929 | B1 * | 7/2013 | Begdouri | B65D 88/76 |
| | | | | 52/745.03 |
| 9,637,091 | B2 * | 5/2017 | Hung | B60L 53/20 |
| 10,196,810 | B2 * | 2/2019 | Bouveng | E04B 1/34807 |
| 10,323,428 | B2 * | 6/2019 | Collins | E04B 1/348 |
| 10,704,251 | B1 * | 7/2020 | Rubler | E04B 1/34815 |
| 10,745,906 | B1 * | 8/2020 | Houston | E04B 1/3483 |
| 11,098,475 | B2 * | 8/2021 | Collins | E04B 1/2403 |
| 2007/0074463 | A1 * | 4/2007 | Ziegelman | E04B 1/3483 |
| | | | | 52/79.1 |
| 2011/0023387 | A1 * | 2/2011 | Sweeney | E04H 9/021 |
| | | | | 52/656.9 |
| 2011/0047889 | A1 * | 3/2011 | Gad | E04H 1/005 |
| | | | | 52/650.1 |
| 2011/0056147 | A1 * | 3/2011 | Beaudet | E04B 1/34869 |
| | | | | 52/79.9 |
| 2014/0137486 | A1 * | 5/2014 | Driess | E04H 5/00 |
| | | | | 52/745.03 |
| 2015/0152634 | A1 * | 6/2015 | Unger | E04B 2/58 |
| | | | | 52/79.8 |
| 2015/0240474 | A1 * | 8/2015 | Kokoschka | E04B 1/34384 |
| | | | | 52/745.02 |
| 2016/0017609 | A1 * | 1/2016 | Bottin | E04D 13/064 |
| | | | | 52/302.1 |
| 2016/0040443 | A1 * | 2/2016 | Stephenson | E04H 1/005 |
| | | | | 52/79.5 |
| 2016/0130795 | A1 * | 5/2016 | Downey | E04H 1/005 |
| | | | | 52/745.02 |
| 2017/0002579 | A1 * | 1/2017 | French | E04B 1/34807 |
| 2017/0044775 | A1 * | 2/2017 | Nyce | B32B 5/024 |
| 2017/0370092 | A1 * | 12/2017 | Gregory | E04B 1/35 |
| 2018/0171653 | A1 * | 6/2018 | Birch | E04H 5/02 |
| 2018/0273288 | A1 * | 9/2018 | Brennan, Jr. | B65D 88/027 |
| 2018/0313076 | A1 * | 11/2018 | Li | E02B 17/00 |
| 2018/0328056 | A1 * | 11/2018 | Collins | E04B 1/2403 |
| 2019/0040619 | A1 * | 2/2019 | Dooley | E04B 1/3483 |
| 2019/0119903 | A1 | 4/2019 | Rebeil | |
| 2019/0148819 | A1 | 5/2019 | Dominguez | |
| 2019/0153720 | A1 * | 5/2019 | Bonlin | E04H 1/02 |
| 2019/0168092 | A1 * | 6/2019 | Beaver | A63B 69/0048 |
| 2019/0257073 | A1 * | 8/2019 | Ledoux | B65D 90/008 |
| 2020/0240159 | A1 * | 7/2020 | Grada | E04H 1/02 |
| 2021/0062495 | A1 * | 3/2021 | Ligeti | E04B 1/34861 |
| 2021/0334425 | A1 * | 10/2021 | Sharinn | E04H 1/005 |
| 2021/0381225 | A1 * | 12/2021 | Ramos | F16B 2/10 |
| 2023/0014744 | A1 * | 1/2023 | Preston | E04G 21/161 |

\* cited by examiner

PLATFORM FOR STACKING CONTAINERS AS HOUSINGS OF COMPONENTS OF AN ENERGY CONVERSION SYSTEM, AND ENERGY CONVERSION SYSTEM

CROSS REFERENCE TO RELATED APPLICATIONS

This application is a continuation of International Patent Application No. PCT/EP2021/063086, filed on May 18, 2021, which claims priority to German Patent Application No. 10 2020 115 328.7, filed on Jun. 9, 2020, and is hereby incorporated by reference in its entirety.

FIELD

The disclosure relates to a platform for stacking containers as housings of components of an energy conversion system. The disclosure furthermore relates to an energy conversion system having a stack of containers with platforms arranged between them.

BACKGROUND

Energy generation from renewable energy sources—in particular, from solar cells—is becoming increasingly important, and the proportion in the grids of the electric power thus obtained increases continuously. For this purpose, inverters with a converter power in the range of several megawatts are frequently integrated into housings with standardized dimensions or standardized fixing points of a cargo container—in particular, of a standardized air or maritime cargo container. Suitably designed, container-like housings allow transport with established transport and loading logistics and at the same time offer sufficient protection of the power electronics against weather influences during both transport and operation. Inverters in the container housing are regularly installed on suitably designed foundations on the ground so that they are easily accessible for installation and maintenance purposes. Several containers are accordingly installed next to one another at a sufficient distance; below, the term, "container", refers to housings with standardized dimensions and with standardized fixing points at standardized locations corresponding to the specifications for cargo containers, even if, for example, the housing is designed only as a platform with a frame. The same applies to energy conversion systems with a storage function, in which inverters are equipped with energy stores—in particular, batteries—which are also integrated in containers and which are installed close to the inverters electrically connected to them.

If it is now necessary to place a high number of containers in a small space, the arrangement of all containers next to one another on the ground reaches its limits, among other things, because too little distance between the containers then limits access to the individual containers for installation or maintenance purposes too much and/or because sufficient heat dissipation of the electronic components in the containers is no longer possible. Such a high container density can be achieved, for example, in an energy conversion system that is arranged in direct spatial proximity to a consumer with extremely high power consumption and that stabilizes the grid connected to the consumer. Another example of an application of an energy conversion system with a high container density may be a system for grid support by means of a provision of reactive and/or active power for a grid section in an urban area.

One possible arrangement of the containers that basically allows for a higher container density with, at the same time, sufficient heat dissipation is stacking the containers one above the other. However, this results in the problem that the containers that are not arranged on the ground can only be reached with difficulty—for example, for maintenance purposes.

For making the stacked containers walkable, documents U.S. 2019/0148819 A1, U.S. 2019/0119903 A1, and DE 203 05 795 U1 disclose different arrangements of balustrades and galleries, which are arranged laterally on the containers at the respective stack levels. Support structures that are arranged next to the containers and reach the floor give the disclosed structures sufficient load-bearing capacity.

SUMMARY

The present disclosure is directed to a platform as a component of a modular system for stacking containers, which modular system enables sufficient accessibility even of containers that are not arranged on the ground, and at the same time enables sufficient heat dissipation of the container stack. It is furthermore an object of this disclosure to present an energy conversion system having a stack of containers produced by means of such a platform.

In a first embodiment, a platform according to the disclosure serves for the space-saving formation of an energy conversion system in that containers are stacked as housings of components of the energy conversion system, one above the other, with the platform arranged between the containers. The platform has a frame structure comprising, on a first side, first alignment elements for placing the platform on a first container and, on a second side, opposite the first side, of the frame structure, second alignment elements for placing a second container on a placement area of the frame structure. The first alignment elements are configured, in one embodiment, as standardized container corners, for example, corner castings, used for cargo containers. Analogously, the second alignment elements are configured, in one embodiment, in a shape that enables the standardized container corners to be arranged in an aligned and fixed manner, for example, as so-called twistlocks. The first and second alignment elements are arranged to result in an arrangement, which is laterally centered and vertically spaced apart by a height of the platform, of the second container above the first container, so that even several containers can be stacked one above the other without the risk of the stack becoming unbalanced and falling over.

In one embodiment, improved heat dissipation from the containers can be ensured by the spacing of containers arranged one above the other. A height of the platform between 30 cm and 1 m can generally ensure sufficient heat dissipation. A further improvement in heat dissipation from the energy conversion system can be achieved in that the standing area is formed by inserting base plates in the form of load gratings into the frame structure. Since load gratings are air-permeable, air exchange is also ensured in the vertical direction. Furthermore, rainwater is not collected in the area of the platform, so that no separate drainage measures are required.

The frame structure forms a standing area, which circumferentially surrounds at least a portion of the placement area and is walkable by persons, as access to the second container. As a result, maintenance personnel, for example, can easily perform installation and maintenance work on the components of the energy conversion system that are included in the containers, even if they are not directly on the ground. In order to provide sufficient freedom of movement for personnel to perform this work, in one embodiment the standing area has a width of at least 1 m, for example, at least 1.5 m. Advantageously, in one embodiment the standing area also has sufficient load capacity for mechanical loads caused by replacement parts or tools placed thereon for performing the installation and maintenance work on the energy conversion system.

To protect personnel using the standing areas from falling, fastening elements for a railing that laterally delimits the standing area are provided on the platform according to one embodiment. Such a railing can then easily be attached when necessary, or permanently.

In one advantageous embodiment, the platform according to the disclosure, in the region of the placement area, has holding elements for guiding supply lines to the containers. The holding elements are configured, for example, as clips or clamps and serve to place the ends of the supply lines at predetermined positions of the platform before a container is placed on the second alignment elements. These positions then correspond to the areas in which the connections for the supply lines are arranged in the second container, so that it is made possible to easily connect the supply lines in the second container after the latter has been placed. The supply lines may, for example, be electrical lines, gas lines, or supply lines of operating media of the energy conversion system.

In a further embodiment, an energy conversion system according to the disclosure is configured to exchange electrical power with a grid. The energy conversion system comprises a stack of at least two containers as housings of components of the energy conversion system, between which containers a platform described above is arranged. An electrical connection and/or media connection of the upper container as well as access to the upper container for performing work thereon are possible via the platform.

In one embodiment, at least one of the containers comprises an inverter. It is likewise conceivable for at least one of the containers to have an energy store, for example, a plurality of battery cells. In this case, it is also not ruled out for an energy conversion system according to the disclosure to have both an energy store and an inverter, and for a container to also contain these two components. An energy conversion system according to the disclosure can be configured, for example, to provide reactive power in the grid and/or to stabilize the frequency of the grid. However, it may also be configured as a UPS (uninterruptible power supply) system which has decoupling elements to the grid, energy transducers, and energy stores.

In a further embodiment according to the disclosure, at least one of the containers of the energy conversion system comprises an electrolysis system. In this case, electrical power of the connected grid can be used to produce hydrogen. By arranging the containers as a stack, such an energy conversion system can easily be scaled in terms of its operating power as needed, while having a low space requirement.

The stack of an energy conversion system according to the disclosure may have more than two, for example, more than four containers, between each of which a platform is arranged. In one embodiment, an energy conversion system comprises a plurality of stacks arranged next to one another, so that the platforms of adjacent stack arrangements directly adjoin one another, and a common level of standing areas is formed. Any gaps forming between the platforms can be covered, for example, by metal sheets. It is also conceivable to increase the stability of the stack arrangement by means of, for example, an elastic connection, e.g., a screw connection or a use of buffer elements, between the platforms of adjacent stacks.

Adjacent stacks can, in particular, also extend in two lateral directions, so that a cluster of containers with common platform levels is formed. In this case, the stacks can be enclosed by a facade in order to form a building structure. In an outside area of the stack clusters, common access to the platform levels can be realized by stairs or an elevator, for example.

BRIEF DESCRIPTION OF THE DRAWINGS

The disclosure is presented below with reference to figures, of which

DETAILED DESCRIPTION

Figure 1:
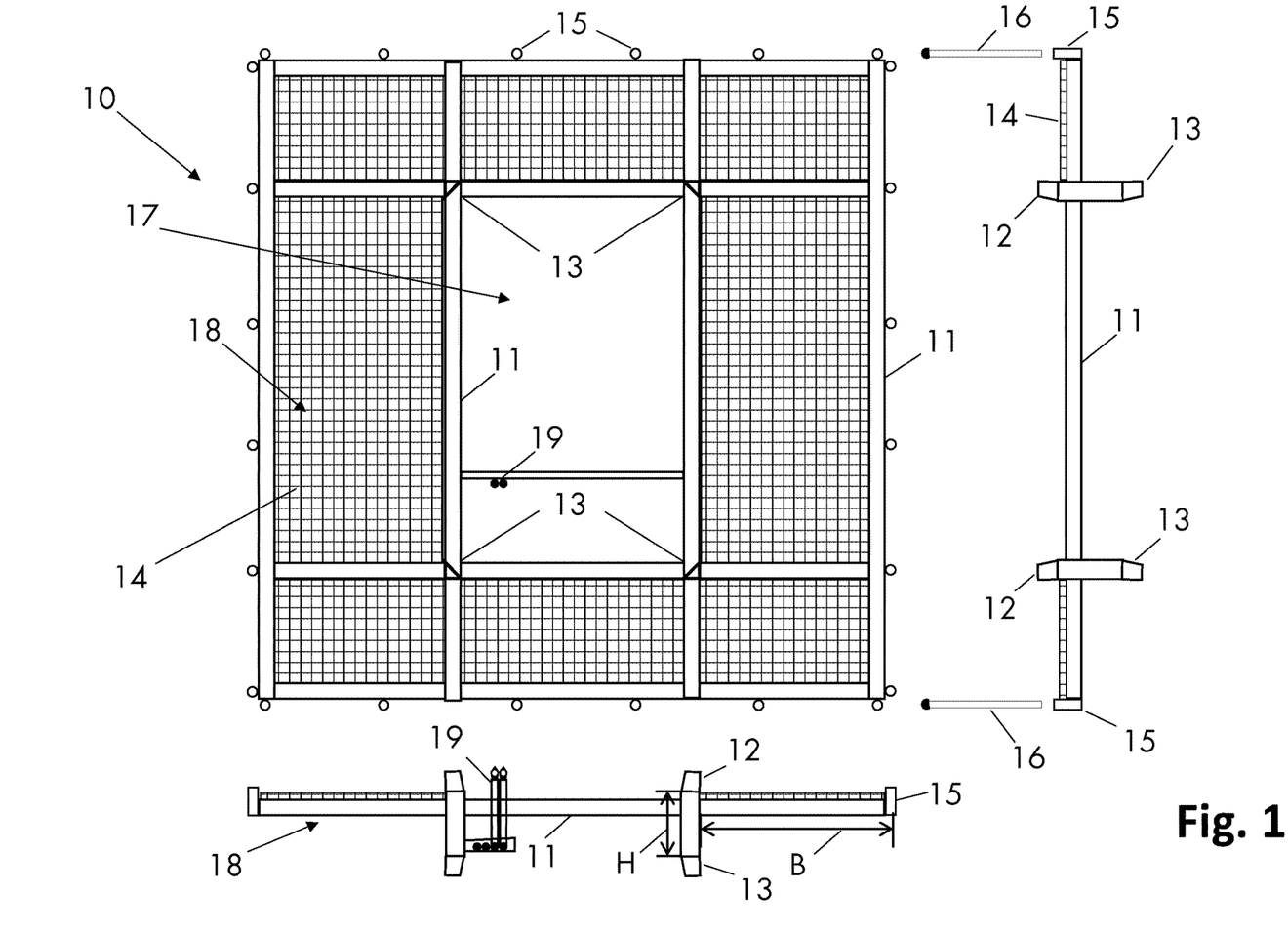
FIG. 1 shows an embodiment of a platform according to the disclosure in multiple views.

FIG. 1 shows an embodiment of a platform 10 according to the disclosure which has a frame structure including a plurality of fixedly-interconnected carriers 11 defining a standing area. The platform 10 is shown in a plan view and two side views, beneath the plan view and to the right thereof. The platform 10 has an inside area 17 at the corner points of which, as well as on an upper side of the frame structure, upper alignment elements 12 are arranged as fixing points for containers, which are designed in such a way that a first container 20 can be mounted on the alignment elements in a defined position. The upper alignment elements 12 are configured, for example, as twistlocks in one embodiment. On an underside of the platform, lower alignment elements 13 with which the platform 10 can be placed onto a second container 20 are likewise arranged. The lower alignment elements 12 are configured, for example, as corner castings, in one embodiment. The upper alignment elements 12 and the lower alignment elements 13 are spaced apart from one another, in a direction perpendicular to the standing area, by a height H, so that the platform defines a distance corresponding to the height H between the two containers. In an outside area 18, surrounding the inside area 17, of the platform 10, base plates 14 are placed onto the frame structure, such that the outside area 18 is designed to be walkable in a width B, and form a standing area so that loads, in particular, can also be placed there. The base plates 14 can consist of air-permeable load gratings. In this respect, it is also conceivable for the frame structure to have a standing area, in the form of a walkable or loadable outside area 18, only on one, two, or three sides of the inside area 17.

Furthermore, the platform has guide elements, e.g., cable ducts, with the aid of which the supply lines 19 are guided to the containers. Holding elements are arranged in the inside area 17, e.g., on a transverse strut of the frame structure, in order to fix the supply lines 19 at a predetermined position of the platform, at which a connection region of a container placed on the upper side of the frame structure on the fixing points is located. In this way, a simple connection of the container can be accomplished via the supply lines. A connection can be an electrical connection to an AC-voltage grid or to a DC-voltage bus, for example. However, it is also conceivable for the supply lines to supply or discharge other media—for example, coolant or gases.

Attached along the outer carriers 11 are, furthermore, fastening elements for a railing 16 in the form of sleeves 15, into which railing rods of the railing 16 can be inserted. These fastening elements can be arranged circumferentially on all sides of the platform 10, only on some sides, or on no side.

Figure 2:
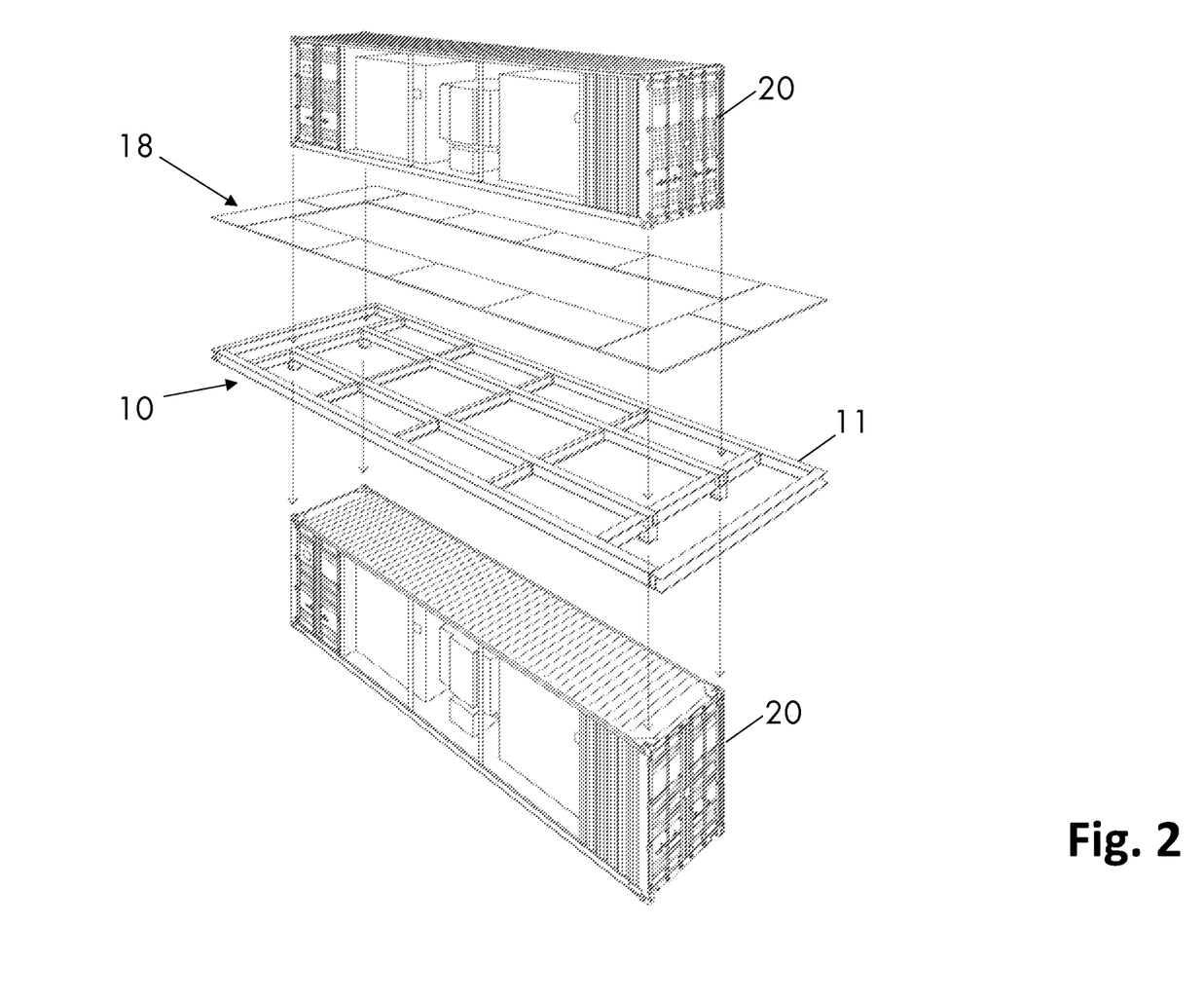
FIG. 2 shows an exploded perspective view of two containers of an energy conversion system with a platform arranged between them.

The arrangement of containers 20 and platform 10 is shown in FIG. 2 in an exploded perspective representation at a further level of detail. The frame structure 11 of the platform 10 is placed with the lower alignment elements (13 in FIG. 1) on the fixing points of the container 20, which is the lower container in FIG. 2. The upper container is then placed on the upper alignment elements (12 in FIG. 1) of the platform 10 in a position aligned with the lower container. By inserting base plates (14 in FIG. 1) into the outside area 18 of the frame structure 11 of the platform 10, a walkable standing area is formed which runs completely around the platform 10 in one embodiment and thus enables access to the upper container on all sides.

Figure 3:
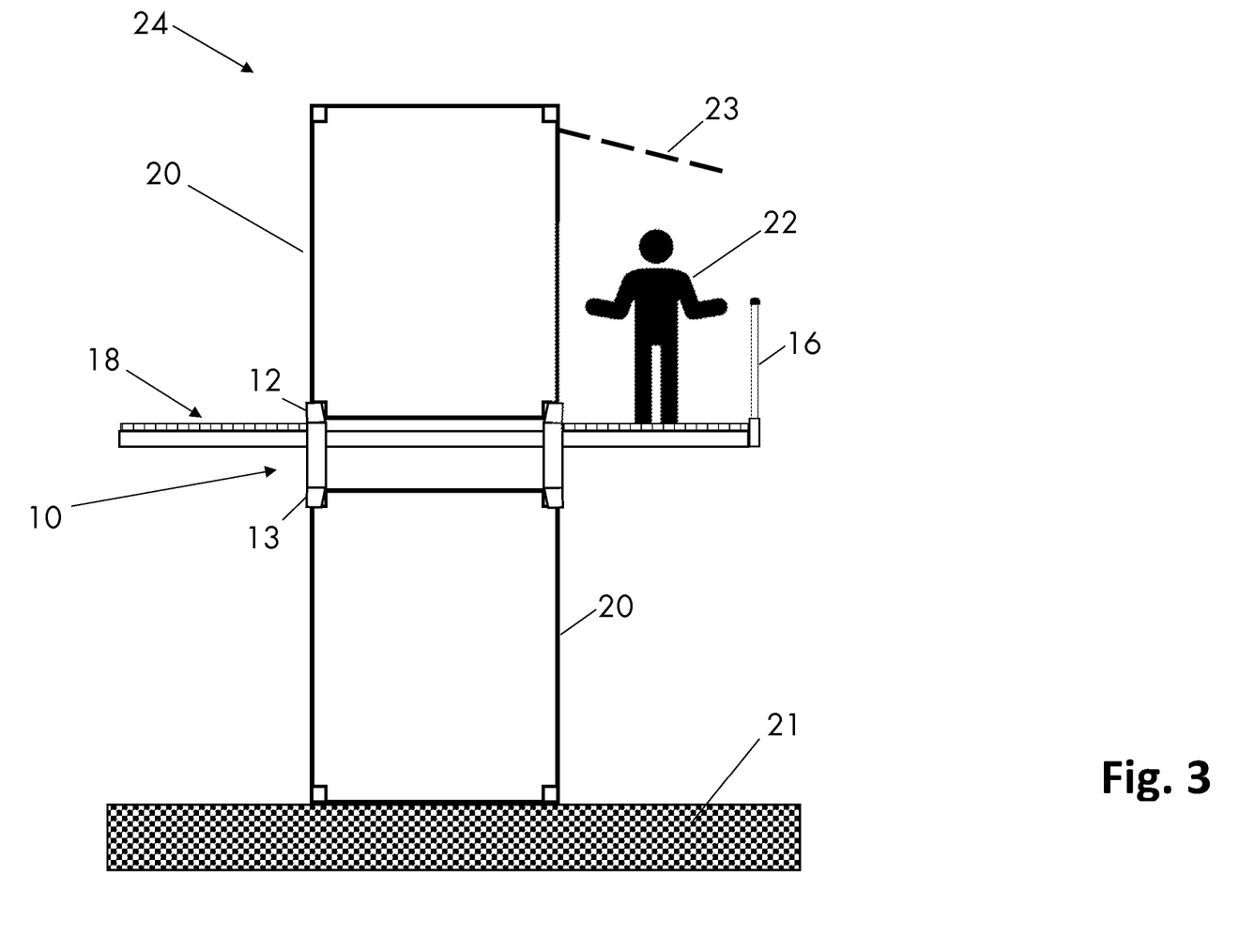
FIG. 3 shows an energy conversion system according to the disclosure with an arrangement of two containers stacked by means of a platform.

FIG. 3 shows an energy conversion system 24 which has two system components arranged in containers 20 as component housings. The system components may comprise electronic power circuits, for example, inverters, or have them as a component part, and/or may, for example, also comprise energy stores. An electric consumer, such as an electrolysis unit, may also be contained in the containers as a component. A first container 20 is in this case placed on a foundation 21. Connecting elements for electrically connecting the electronic power circuit or the energy store may be integrated into the foundation 21.

A platform 10 according to the disclosure is placed on an upper side of the first, lower container 20 such that the lower alignment elements 13 of the platform are placed on the standardized fixing points of the container 20 that are located at the corners, and the platform 10 thus assumes a defined position in relation to the first, lower container 20. A second, upper container 20 is placed, with the container corners, on the upper alignment elements 12 of the platform 10, which second, upper container 20 thus likewise assumes a defined position and is arranged, laterally aligned, above the first container 20. The laterally-aligned arrangement makes it possible to place a further platform and a further container on the upper container, and thus to form a stack with a plurality of containers. Depending upon the weight capacity of the containers or of the platforms and upon the stability requirement with respect to a lateral force, e.g., due to side wind, stacks of five or more containers can be formed. The upper container(s) 20 are also electrically connected to connecting lines (not shown), wherein the platform 10 can have holding elements or guide elements for the connecting lines.

The outside area 18 of the platform 10, as a walkable and loadable standing area, enables a person 22 to access the upper container 20 from the side as shown. By means of a maintenance flap 23, the person 22 also has access to the interior of the container 20 and can, for example, perform installation or maintenance work there at a height above the foundation 21 at which a mobile working platform would otherwise be required. The standing area can be accessed via stairs or a ladder.

By means of a sufficient selected distance between the containers 20, and by means of the air-permeable base plates 14, effective heat dissipation for all containers 20 can be ensured, since a substantially unimpeded air exchange can take place. Precipitation water must also be discharged only at the level of the foundation 21.

Figure 4:
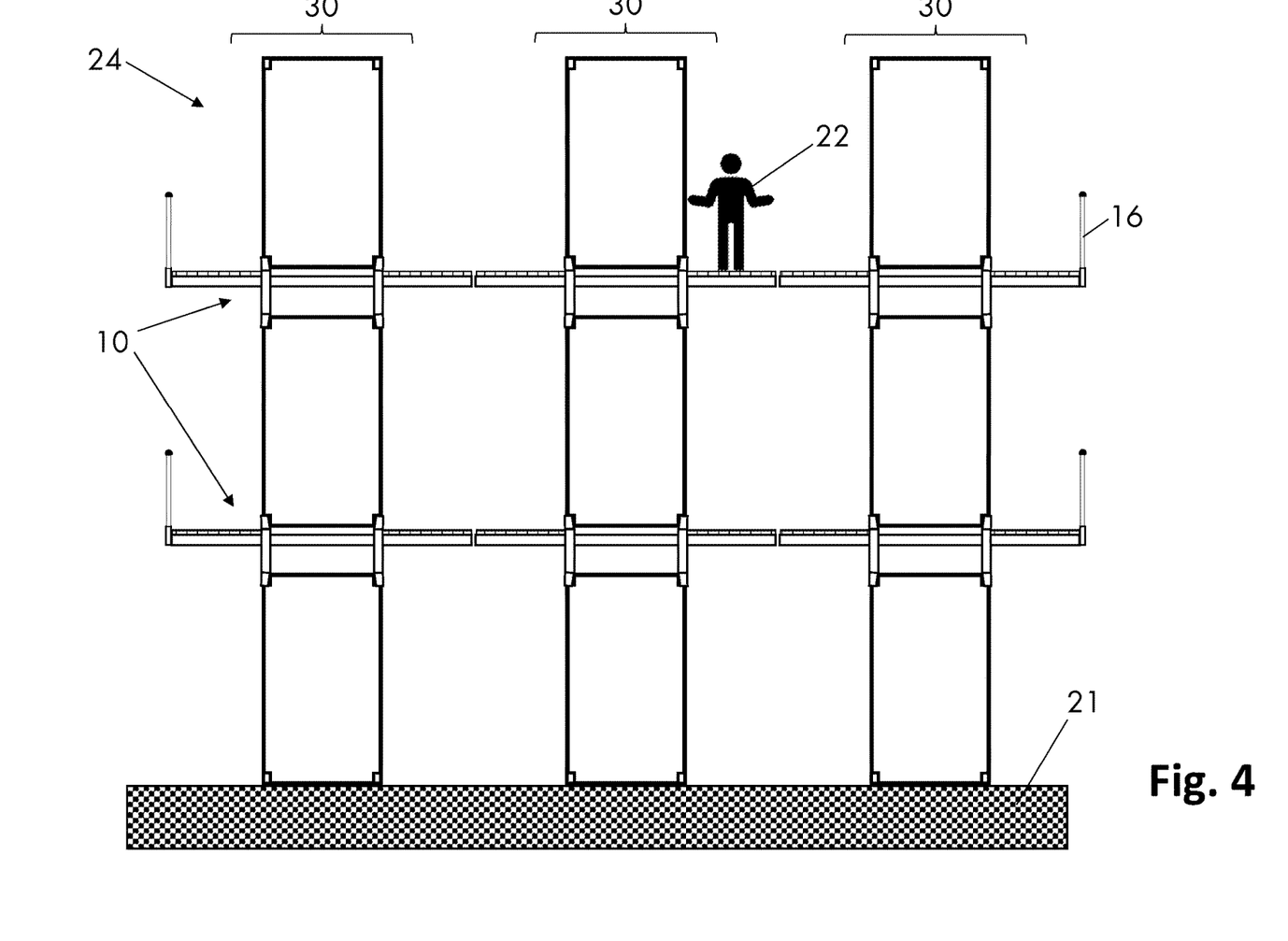
FIG. 4 shows an energy conversion system according to the disclosure with stacks of containers arranged next to one another.

As shown in FIG. 4, a plurality of stacks 30 of containers 20 and platforms 10 can be placed next to one another or one behind the other on a foundation 21 and form a common energy conversion system 24, wherein the stacks then line up in one or two horizontal directions. The platforms 10 of the stacks 30 arranged next to one another or one behind the other then form a contiguous level of standing areas, wherein a gap remains between adjacent platforms and can be covered, for example, with metal sheets when necessary. A railing 16 is then required only on the outsides of the stacks 30. Access, e.g., stair access, to the levels of the standing areas can likewise be arranged on the outside.

In the arrangement shown in FIG. 4, it is furthermore possible to replace any container 20 with little effort by lifting it, after the electrical connections have been disconnected, vertically out of the arrangement by means of a crane after any superjacent platforms and containers have likewise been lifted out vertically. The superjacent containers 20 are temporarily placed elsewhere, the relevant container is replaced, and the containers, each with a platform arranged between them, are placed one on top of the other again as a stack within the arrangement. Thereafter, the containers 20 are electrically connected again.

Figure 5:
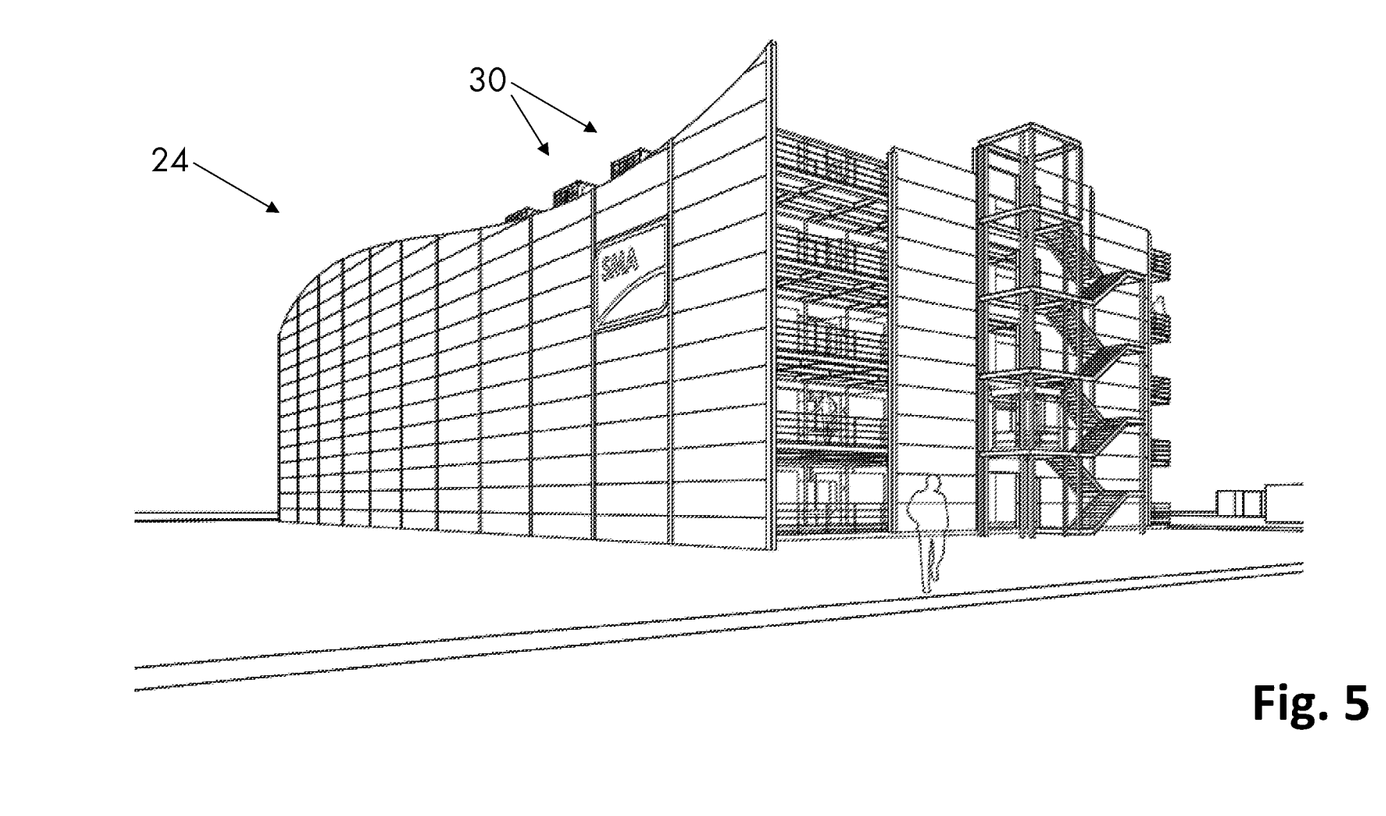
FIG. 5 shows an energy conversion system, designed as a building structure, with stacks of containers arranged next to one another.

The arrangement shown in FIG. 4 can be formed as a building structure in that, on the outside of the plurality of stacks 30, a facade is attached which, along with an optical cladding, contributes to the mechanical stability of the arrangement. Such a building structure is shown in FIG. 5. Stairs or an elevator can also be integrated into the building structure on the outside. In a further embodiment, stacks of containers may also be arranged on the outside of a building.

The containers 20 of a stack 30 may form a functional unit, e.g., have an inverter and all energy stores connected to said inverter on the DC voltage side. The energy conversion system 24 can thus be easily expanded by adding further stacks.

The invention claimed is:

1. A platform for a space-saving design of an energy conversion system, in that containers are stacked as housings of components of the energy conversion system, one container above another, with the platform arranged between the containers, the platform comprising:
   a frame structure comprising, on a first side, first alignment elements for placing the platform on a first container and, on a second side, opposite the first side, of the frame structure, second alignment elements for placing a second container on a placement area of the frame structure,
   wherein the first and second alignment elements are configured to position an arrangement, which is laterally centered and vertically spaced apart by a height (H) of the platform, of the second container above the first container,
   wherein the frame structure comprises a standing structure, which circumferentially extends and surrounds at least a portion of the placement area, and is walkable thereon by persons, as access to the second container.

2. The platform according to claim 1, wherein the standing structure comprises base plates comprised of load gratings.

3. The platform according to claim 1, wherein the platform, in a region of the placement area comprises holding elements configured to guide supply lines to the containers.

4. The platform according to claim 1, further comprising fastening elements on the platform configured to receive a railing that laterally delimits the standing structure.

5. The platform according to claim 1, wherein the height (H) of the platform comprises a distance between 30 cm and 100 cm.

6. The platform according to claim 1, wherein a width (B) of the standing structure is at least 1 m.

7. An energy conversion system for exchanging electrical power with a grid, comprising:
- a stack of two containers as housings of components of the energy conversion system, between which containers a platform is arranged, the platform comprising:
- a frame structure comprising, on a first side, first alignment elements for placing the platform on a first container of the stack of two containers and, on a second side, opposite the first side, of the frame structure, second alignment elements for placing a second container of the stack of two containers on a placement area of the frame structure,
- wherein the first and second alignment elements are configured to position an arrangement, which is laterally centered and vertically spaced apart by a height (H) of the platform, of the second container above the first container; and
- a plurality of stacks arranged laterally next to one another such that platforms of adjacent stack arrangements directly adjoin one another so that a common standing structure is formed therebetween.

8. The energy conversion system according to claim 7, wherein at least one of the containers comprises an inverter.

9. The energy conversion system according to claim 7, wherein at least one of the containers comprises an energy store.

10. The energy conversion system according to claim 7, wherein the components are configured to provide reactive power in the grid or to stabilize a frequency of the grid, or both.

11. The energy conversion system according to claim 7, wherein the components are configured as an uninterruptible power supply system that has decoupling elements to the grid, energy transducers, and energy stores.

12. The energy conversion system according to claim 7, wherein at least one of the containers comprises an electrolysis system.

13. The energy conversion system according to claim 7, wherein the stack has more than two vertically stacked containers, between each of which the platform is arranged.

14. The energy conversion system according to claim 7, wherein adjacent stacks extend in two lateral directions.

15. The energy conversion system according to claim 7, wherein the stacks are enclosed by a facade in order to form a building structure.

16. The energy conversion system according to claim 7, wherein the standing structure comprises base plates comprised of load gratings.

* * * * *